No. 862,894. PATENTED AUG. 13, 1907.
J. R. FORDYCE.
TROLLEY FOR CARRYING BALES OF COTTON.
APPLICATION FILED NOV. 21, 1906.
2 SHEETS—SHEET 1.
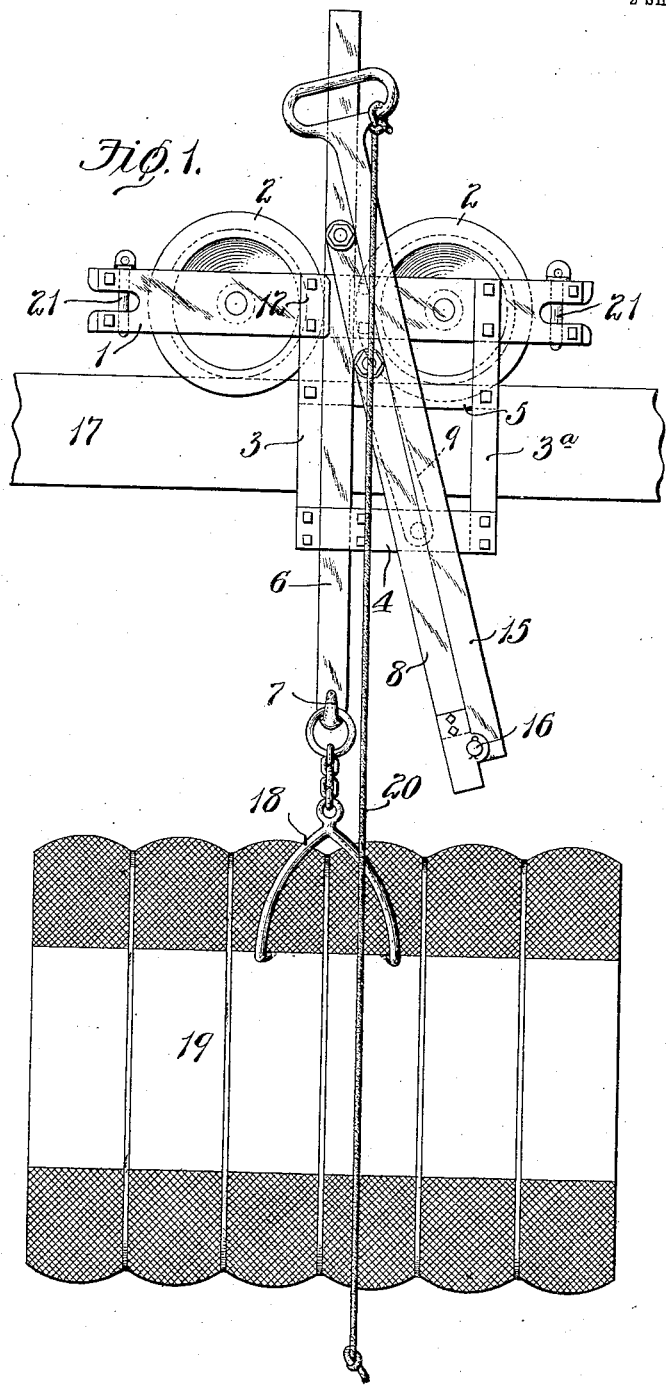

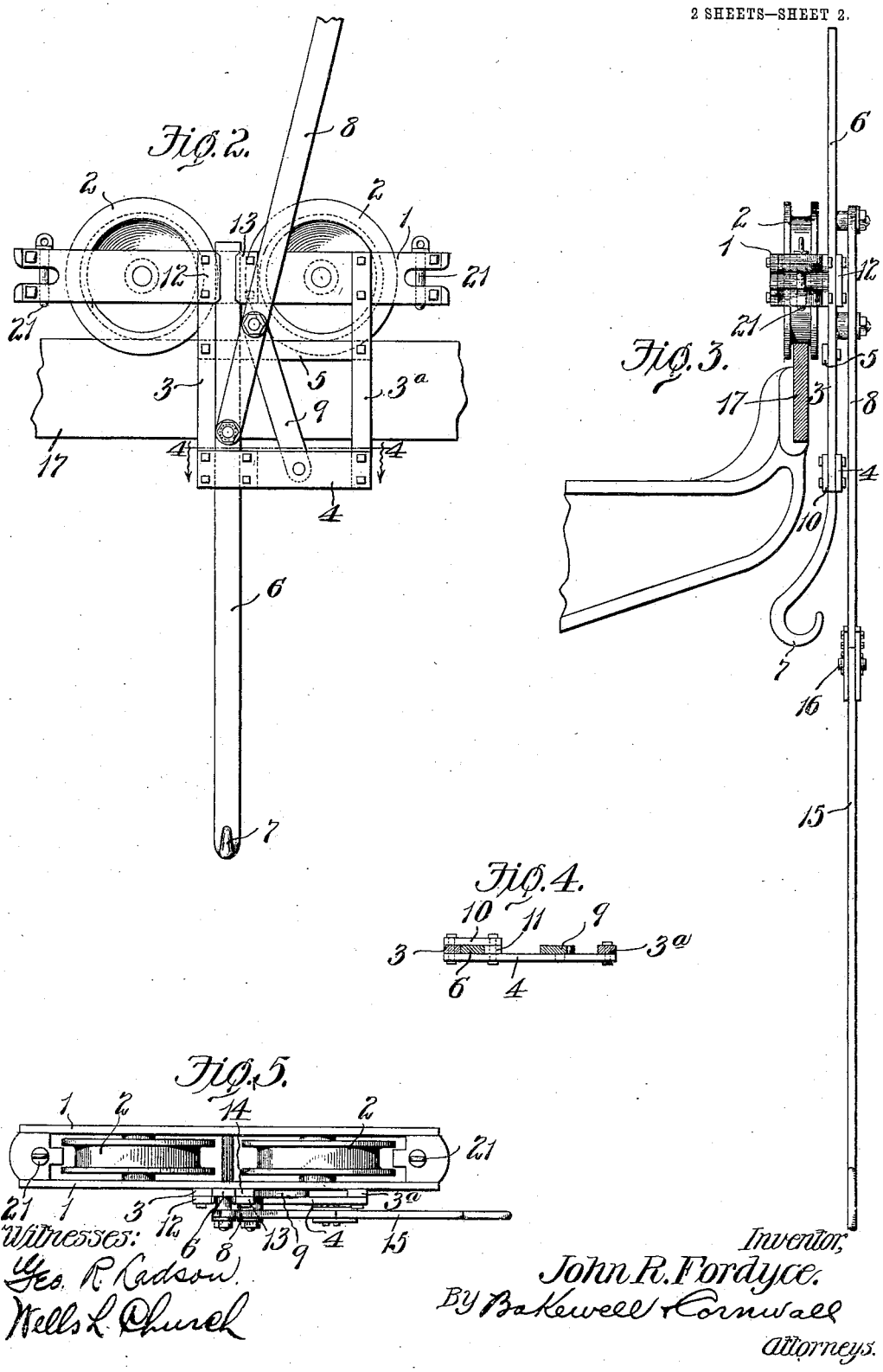

UNITED STATES PATENT OFFICE.

JOHN R. FORDYCE, OF LITTLE ROCK, ARKANSAS.

TROLLEY FOR CARRYING BALES OF COTTON.

No. 862,894.          Specification of Letters Patent.          Patented Aug. 13, 1907.

Application filed November 21, 1906. Serial No. 344,442.

*To all whom it may concern:*

Be it known that I, JOHN R. FORDYCE, a citizen of the United States, residing at Little Rock, Arkansas, have invented a certain new and useful Improvement in Trolleys for Carrying Bales of Cotton, of which the following is a full, clear, and exact description, such as will enable others skilled in the art to which it appertains to make and use the same, reference being had to the accompanying drawings, forming part of this specification, in which—

Figure 1 is a side elevation of a trolley or conveyer embodying the features of my invention showing a bale of cotton supported thereby; Fig. 2 is a side elevation of the trolley showing the supporting bar in its lowered position; Fig. 3 is an end view of the trolley; Fig. 4 is a horizontal sectional view taken on the line 4—4 of Fig. 2; and Fig. 5 is a top plan view of the trolley with the parts in the position shown in Fig. 2.

This invention relates to devices for handling bales of cotton.

The object of my invention is to provide a trolley or conveyer adapted to run on a track and having means for raising a bale of cotton from a floor or platform and holding it in an elevated position.

Referring to the drawings which represent the preferred form of my invention, 1 designates the side rails which form the frame of the trolley in which the wheels or rollers are journaled.

While I have herein illustrated the preferred form of my invention as comprising two grooved wheels or rollers 2 it should be understood that one or more wheels could be used if desired and that the particular form of wheel is immaterial so far as my invention is concerned.

Fastened to the outside of one of the side rails 1 are two downwardly extending members 3, 3ª, that are connected at their lower ends by a cross-piece 4 which is fastened to the front faces of said members, a second cross-piece 5 being secured to the rear faces of the members 3 and 3ª adjacent the side rails of the frame. A bar 6 provided at its lower end with a hook 7 is reciprocatingly mounted in the depending frame formed by the members 3, 3ª, and cross-pieces 4 and 5, and said bar is actuated by means of a lever 8 fulcrumed on the upper end of a link 9 that is pivotally connected at its lower end to the cross-piece 4, the lower end of the bar being bent inwardly so that the hook will be located in alinement with the track on which the trolley travels. The bar 6 is guided in its movements by means of a strap 10 fastened to the rear face of the member 3 and to a filler 11 on the cross-piece 4, as shown in Fig. 4, and also by means of a flanged block 12 fastened to the front face of the member 3 at the point where said member is secured to the side rail 1 and a flanged block 13 which is held spaced away from the side rail by a filler 14.

A handle 15 is removably connected to the outer end of the lever 8 by means of a pin 16 and cotter, thereby permitting said handle to be disconnected from the lever or turned into the position shown in Fig. 1 after the bale has been elevated.

When the trolley is in position on the track 17 on which it travels and the bar 6 is in its lowered position, as shown in Fig. 2, the cotton hooks 18 which engage the bale 19 can be hooked onto the bar 6. The outer end of the lever 8 is then pulled downwardly thereby causing the bar 6 to move upwardly and thus raise the bale of cotton from the platform or floor. When the lever has reached the position shown in Fig. 1, it will be locked in this position and the bale retained in its elevated position due to the fact that the lever 8 has moved past the center of the pivot which connects the link 9 to the cross-piece 4, the weight of the bale causing the upper end of the link 9 to bind tightly against the edge of the bar 6.

Owing to the fact that the handle 15 projects upwardly quite a distance when the bar 6 is in its lowered position I prefer to attach a rope or chain 20 to the outer end of the handle so that it can be actuated easily. In order that several trolleys may be connected together I mount coupling pins 21 at each end of the frame of the trolley.

Having thus described my invention, what I claim as new and desire to secure by Letters Patent is:

1. A trolley or conveyer consisting of a frame having a wheel journaled thereon, a reciprocating member to which the article that is to be carried is connected, a link fastened to a support that extends downwardly from the frame, and a lever fastened to said link and pivotally connected to said member for actuating it; substantially as described.

2. A trolley or conveyer consisting of a frame having a plurality of wheels journaled thereon for traveling on a track, a reciprocating bar provided at its lower end with an engaging device, members projecting downwardly from said frame to form a support and guideway for said bar, a link connected at its lower end to one of the members of said support, and a lever pivoted to the bar and fulcrumed at the upper end of said link; substantially as described.

3. A trolley or conveyer comprising a frame having wheels journaled therein for traveling on a track, a vertically reciprocating bar arranged at one side of said frame and connected thereto, an engaging device at the lower end of the bar, said bar being bent inwardly so that its engaging device is located in alinement with the track on which the trolley travels, a lever pivotally connected at its inner end to said bar for actuating same, and a link fastened at its lower end to said frame and pivotally connected at its upper end to the lever at a point which is approximately the same distance from the pivotal connection of said lever and bar as the length of said link; substantially as described.

In testimony whereof I hereunto affix my signature in the presence of two witnesses, this 30 day of October 1906.

JOHN R. FORDYCE.

Witnesses:
    COLUMBUS BIERCE,
    A. G. CRAWFORD.